United States Patent Office 3,263,759
Patented August 2, 1966

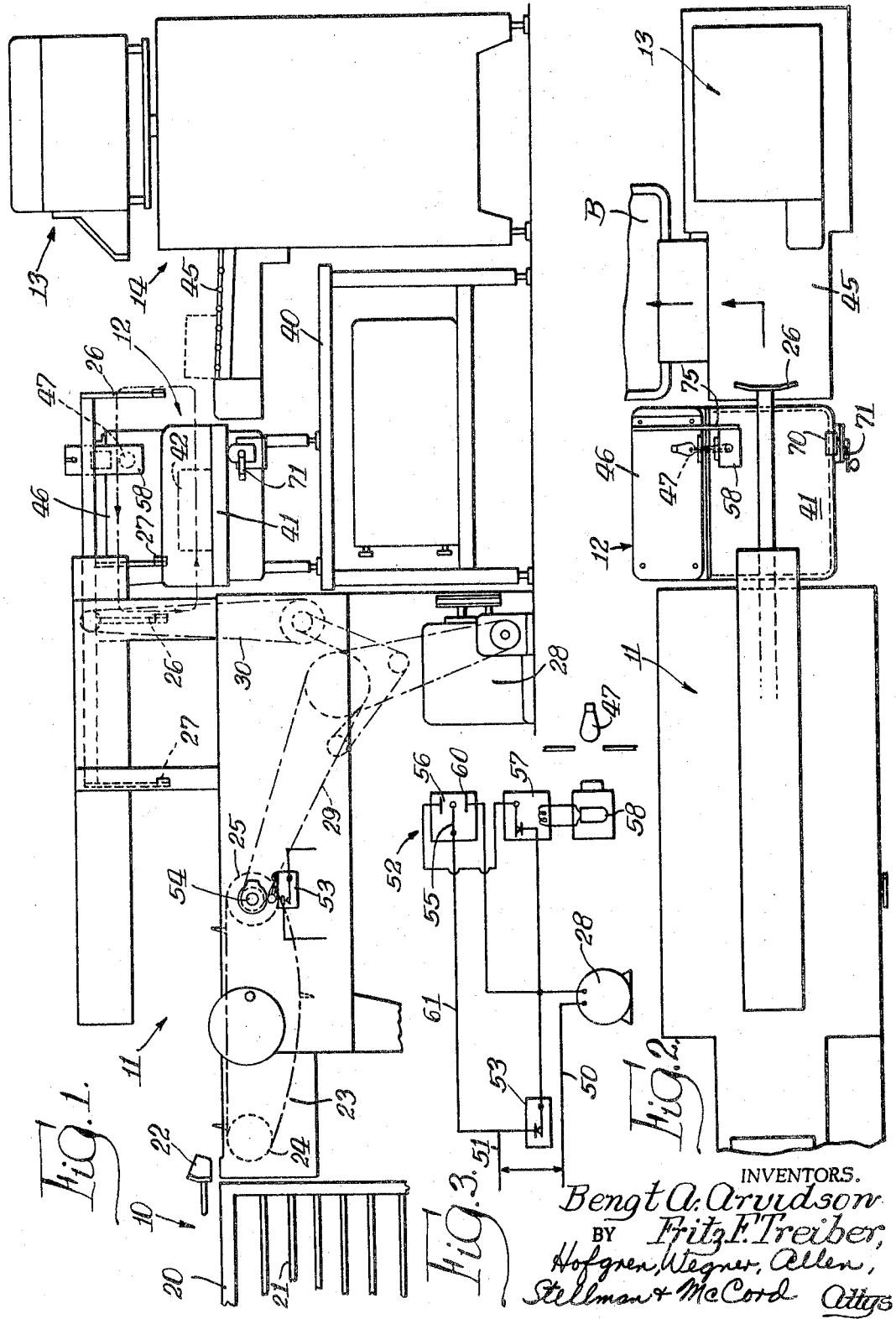

3,263,759
PACKAGE WEIGHING AND CONVEYING SYSTEM
Bengt A. Arvidson, Villa Park, and Fritz F. Treiber, Niles, Ill., assignors, by mesne assignments, to Corley-Miller, Inc., a corporation of Ohio
Filed July 30, 1964, Ser. No. 386,331
7 Claims. (Cl. 177—52)

This invention relates to a package weighing and conveying system and, more particularly, to an interlocking system for coordinating the weighing of a package with the conveying thereof.

At the present time, package wrapping, weighing and labeling systems are available in which a package, after being wrapped, is automatically conveyed to a weighing scale where the weight of the package is determined with the weighing scale controlling a label printing unit which prints a label indicating the proper weight and price for the package, with the system including mechanism for placing the printed label on the package. With the cycle of these system components being in timed relation, it is necessary to determine that the weighing scale has properly read the weight of the package before the package is advanced away from the platform of the weighing scale. In the systems presently available, an automatic interlocking system is provided in which the conveying mechanism of the wrapping machine will be stopped until the scale has made weight and caused the labeling unit to print a ticket. This system requires a complex, involved wiring system with many electrical connections inside the weighing scale. When the scale requires service, the wiring connections make the exchange or service of the scale difficult.

An object of this invention is to provide an automatic interlocking system between the package conveying mechanism and the weighing scale which avoids the use of any electrical connections between the scale and conveying mechanism.

Another object of the invention is to provide a conveying mechanism in combination with a weighing scale, in which the scale has a movable platform for receiving a package to be weighed and a light which is lighted when the scale makes weight with an electrical control circuit for the drive of the conveying mechanism which will stop the conveyor unless a photocell and relay energized thereby detect that the light is lit to continue the conveyor in operation, whereby no direct connection with the scale is required but only the location of a photocell adjacent the scale light.

Still another object of the invention is to provide a system as defined in the preceding paragraph in which a multi-position switch is provided in the circuit with this switch in one position providing the interlock system, as defined in the preceding paragraph, and a second position of the switch causes continuous operation of the conveyor, with a third position causing discontinuance of conveyor operation in order to permit hand weighing operations.

Still a further object is to provide a structure in which repeat labeling can be obtained with every package having a label printed with the same weight and price, wherein the scale platform must be held against movement as packages move onto the scale, with this being accomplished by the use of a manually operable member engageable with the scale platform to hold it against movement.

Further objects and advantages will become apparent from the following detailed description taken in connection with the accompanying drawings in which:

FIG. 1 is a side elevational view of the apparatus embodying the invention;

FIG. 2 is a plan view of the structure shown in FIG. 1; and

FIG. 3 is a schematic drawing of the electrical circuit.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

The apparatus disclosed herein embodies several major components, with a pre-wrap table and sealer indicated generally at 10, where an operator initially bands wrapping material around a package and forms an initial seal across the bottom of the package. The package is then placed in the wrapping machine, indicated generally at 11, with the completion of the package wrap occurring as the package moves from left to right as viewed in FIG. 1. The package then leaves the wrapping machine and advances to a scale, indicated generally at 12, which weighs the package and causes a label printer and dispenser, indicated generally at 13, to print a label which is then applied to a package that is advanced to the right off the scale 12 by means of label attaching mechanism, indicated generally at 14.

The pre-wrap table and sealer 10 and the wrapping machine 11 are of the construction shown in Arvidson patent, No. 2,981,043, dated April 25, 1961, and reference may be made to this patent for a more detailed description of this structure. Basically, the pre-wrap table involves a frame with a top 20 having a plurality of sheet-storing shelves 21 and a heated sealing plate 22 which makes an initial seal across the bottom of the package after it is initially banded with wrapping material. The operator then places the package at the left-hand end of the wrapping machine 11, as viewed in FIG. 1, where a conveyor 23, which passes about sprockets 24 and 25, advances a package to the right and to the point where further wrapping of the package occurs. The package is then further advanced through the wrapping stations of the wrapping machine by an overhead conveyor having a four-way motion and including a series of paddles 26 and 27 corresponding to the paddles 130–133 of the aforesaid patent. The conveyor chain 23, as well as the overhead conveyor having the paddles 26 and 27, is driven from a motor 28, which drives a chain 29 running to the conveyor 23 and a chain 30 extending vertically to a location to drive the overhead paddle conveyor.

The package-weighing mechanism 12, label-printing mechanism 13 and label-applying mechanism 14, are of the type disclosed in the copending application of Bengt A. Arvidson and Fritz F. Treiber, Serial No. 200,608, filed June 1, 1962, and the disclosure thereof is incorporated herein by reference. Generally, a table 40 supports the scale 12, with the scale having a movable platform 41 onto which a package 42 is advanced by the conveyor paddle member 27. The furthest advanced position of the paddle member 27 is shown in full line in FIG. 1, with the retracted position thereof shown in broken line. The advance of a package 42 off the scale is accomplished by the leading paddle member 26, which is shown in fully advanced position in full line and retracted position in broken line in FIG. 1. The package is moved from the scale by the paddle member 26 in its advance onto a roller conveyor 45, where the package is positioned to receive a label by means of a transfer arm associated with the label-attaching mechanism 14 and, more particularly described in the aforesaid application. This label has been printed and delivered to a pick-up position by the label-printer and dispenser 13. The package, after being labeled, can then be conveyed laterally to a storage bin B.

The scale 12, in addition to the movable weighing platform 41, has a scale tower 46 which, as known in the art, includes various dials and an opening in the front panel to the rear of which is located an electric light 47. This light is energized when the platform 41 has stabilized under the weight of a package 42 thereon. This light indicates that the proper information has gone to the label-printer 13 and the placement of the package on the platform 41 is no longer important. It is this light signal which is used for further conveying of the package away from the scale and which prevents conveying of the package in the absence of energization of the light.

Referring to FIG. 3, the circuit for obtaining the proper cycle of operation is more particularly shown in which the main drive motor 28 is connected to one side of the line, through line 50. The motor 28 is connected to the opposite side of the line 51 through a single pole, double throw switch 52. This switch has a center open position in which the motor is subject only to the control of a limit switch 53 which is normally closed and is openable, one time in each cycle of the conveying mechanism, by a cam 54 on the drive shaft for the sprocket 25. Thus, when the limit switch is opened, the conveying mechanism will no longer operate, with this time occurring when the leading paddle member of the conveyor, namely paddle 26, is in its retracted, broken line position, so that the conveying mechanism is no longer operative and hand-weighing can be accomplished.

The three-position switch 52 has an upper, closed position with the switch arm 55 engageable with a contact 56 which places a relay 57 in circuit in parallel with the limit switch 53. The relay 57 is normally open, so that the control of the motor 28 is under control of the limit switch 53. However, the relay is energized by a photocell 58 when the scale light 47 is energized. In this mode of operation, the cyclical conveying operation only functions to advance a package 42 off the scale platform 41 when weight is made. This means that if weight has not been made at a certain time in the cycle, the limit switch 53 will stop operation of the motor 28 and the conveyor. However, if the weight has been made at that time, as would normally occur, the light 47 would be energized to cause the photocell 58 to conduct, which will close the relay 57 to maintain the motor circuit 28 closed, even though the limit switch 53 has opened.

In the third position of the switch 52, the switch arm 55 engages a contact 60 and this results in placing the motor 28 in direct connection with the side 51 of the line, through a line 61. This results in repetitive cycling of the conveying mechanism without stopping by opening of the limit switch 53, so that the wrapping machine may continuously operate as when the packages are not to be weighed and labeled.

When performing a repeat labeling operation, when each package is not to be weighed, it is necessary that the scale platform 41 be held against movement, and for this purpose, a rotatable eccentric 70 is mounted in front of the scale beneath the platform and is rotatably moved up into engagement with the platform underside by a handle 71.

With the structure disclosed herein, it is possible to utilize the wrapping machine without weighing by moving the switch arm 55 of switch 52 into engagement with the switch contact 60 to place the motor 28 continuously in operation. This position is also used for the repeat labeling, when every label is printed with the same weight and price. It is in this latter operation, that the eccentric 70 is positioned to hold the scale platform 41 against movement.

When it is desired to use the scale and label printing devices in a hand-weighing operation, the switch arm 55 is placed in central, open position, with the result that the conveying mechanism stops once the limit switch 53 opens, with the leading paddle 26 being in retracted, non-interfering position.

For regular, automatic weighing and printing operation, the switch arm 55 of the switch 52 is placed in position in contact with contact 56 to place the relay 57 in parallel with the limit switch 53 to obtain the operation described previously.

The photocell 58 is supported from a bracket 75 attached, as by bolts, to the scale tower and thus no electrical connections are required to tie the circuit in with the circuit of the scale 12 and the scale can be easily exchanged for another when repairs are required, without requiring the delays now encountered in having to disconnect various circuits.

We claim:

1. A package weighing system comprising a weighing scale with a movable platform and a light which is energized when a package is weighed, a conveyor for advancing a package off said platform and a succeeding package onto said platform, a motor for cyclically operating said conveyor, means for stopping the movement of the conveyor in each cycle of operation, and means responsive to the energization of said light for causing the continued operation of the conveyor to advance the weighed package off said platform, said conveyor stopping means comprising a limit switch and the light responsive means including a photocell and relay arranged in parallel in a circuit, said circuit further including a single pole double throw switch having a center open position, a first closed position to place said limit switch and relay in parallel and a second closed position which bypasses the limit switch and relay to obtain continuous operation of the conveyor.

2. A package weighing system as defined in claim 1 in which a manually operable platform lock is positioned to hold the platform against movement when the switch is in the second closed position to permit repeat labeling.

3. A package weighing and conveying mechanism comprising, a scale having a platform and a light which when energized indicates a package has made weight, a conveyor for advancing a package off said platform and a succeeding package to said platform, means including a motor for intermittently cycling said conveyor, a motor controlling circuit including a limit switch openable in each conveyor cycle for opening the circuit, and a light responsive relay in parallel with said switch and responsive to said light to maintain the motor circuit closed.

4. A mechanism as defined in claim 3 including a three position switch for bypassing said limit switch and relay to bypass the weighing operation in one position thereof and bypassing said relay only in another position to have said limit switch control the conveyor.

5. A package weighing and conveying system comprising a weighing scale having a platform onto which a package is placed for weighing, said scale having a normally deenergized light which is energized when the scale makes weight, a sequentially operable conveyor for moving a package onto the scale platform and moving the package from the scale, means including a motor for continuously cycling said conveyor, means for stopping said conveyor if the scale does not make weight in a predetermined time, and means responsive to making of weight within the predetermined time to continue said conveyor in operation comprising a photocell positioned in light-receiving relation with said scale light whereby energization of said light activates said photocell to indicate completion of a weighing operation.

6. In combination, a weighing scale having a movable platform for detecting the weight of a package and a light source which is off during platform movement but which is energized when the platform has made weight, a conveyor for transporting packages relative to said scale including conveying elements movable across the scale whereby as one element moves a weighed package off the scale platform a succeeding element is moving a succeeding package onto the scale platform, a motor for operating said conveyor, a normally closed switch selectively operable once in each cycle of operation when a package has been on said platform a predetermined time to stop said conveyor, a relay with a switch in parallel with said switch, and a photocell for controlling said relay positioned adjacent the scale light source to sense light energization which indicates a package has been weighed and cause said relay switch to bypass said normally closed switch to have the conveyor continue through a cycle without stopping if the scale has made weight in the predetermined time or again start the conveyor if said predetermined time has been exceeded.

7. In a combination as defined in claim 6 wherein said scale has a scale tower upstanding to one side of said scale platform, a front opening in said scale tower, said light source being mounted in said scale tower to the rear of said front opening, and means mounting said photocell on said scale tower directly in front of said front opening.

References Cited by the Examiner

UNITED STATES PATENTS

| | | | |
|---|---|---|---|
| 2,104,546 | 1/1938 | Pennell et al. | 177—52 X |
| 2,489,899 | 11/1949 | Kniazuk et al. | 177—121 |
| 2,902,272 | 9/1959 | Meier | 177—154 X |
| 2,976,703 | 1/1961 | Jones | 177—145 |

OTHER REFERENCES

Cutting Production Cost With Electronic Controls, volume 2, Photoswitch Division, Electronic Corporation of America, Cambridge 42, Mass.

LOUIS J. CAPOZI, *Primary Examiner.*

LEO SMILOW, *Examiner.*

G. J. PORTER, R. S. WARD, *Assistant Examiners.*